May 7, 1968  Q. BARLOCCI  3,381,664
SMALL ANIMAL CAGE
Filed Dec. 12, 1966  7 Sheets-Sheet 4

INVENTOR
QUINTO BARLOCCI
BY Stowell & Stowell
ATTORNEYS

United States Patent Office 3,381,664
Patented May 7, 1968

3,381,664
SMALL ANIMAL CAGE
Quinto Barlocci, Milan, Italy
(Calle de Padua 97, Barcelona 6, Spain)
Continuation-in-part of application Ser. No. 306,801,
Sept. 5, 1963. This application Dec. 12, 1966, Ser.
No. 601,052
4 Claims. (Cl. 119—17)

ABSTRACT OF THE DISCLOSURE

A snap apart plastic cage having side wall members formed with edge portions carrying socket means snapingly receiving the heads of elements bridgingly extending between the members with wall forming panel formations provided on the elements to constitute the front, top, back and bottom walls for the cage.

---

This application is a continuation-in-part of copending application Ser. No. 306,801 filed Sept. 5, 1963 and the invention disclosed herein relates generally to cages, and more specifically to a novel cage enclosure for small animals such as poultry or the like.

Traditional cages for aviculture installations, particularly for egg producing hens, generally comprise an iron structure, which involves considerable weight and also high cost. Further it is difficult to arrange the traditional cages, one alongside the other, by connecting two or more in one single multiple structure because of the excessive total weight involved in such a structure.

Also the economical factor is a valid argument for the replacing of the traditional iron cages with single or multiple structures of plastic material consisting of easily assembled and disassembled cast or molded members.

I have discovered a novel snap-apart cage for chickens or the like.

It is, therefore, an object of the present invention to provide a light-weight, plastic cage for chickens or the like capable of easy disassembly for cleaning and storage.

It is a further object of the invention to provide such a cage fabricated of readily assembled parts which occupy a minimum of space during storage.

These and other objectives and advantages of the present invention will become apparent on consideration of the cages more fully described in the following discussion and accompanying drawings, wherein:

The cages of the present invention are characterized by the presence of a plurality of elements which snap into corresponding sockets in planar structures which form side walls of the cages.

The connecting system of the members themselves for building the cages, of one form of the invention, has been developed by using members having T-shaped and hollow ends to be alternately inserted on tie rods, preferably consisting of tubular means constituting the auxiliary members which act as hinging pins.

As a modified embodiment, the head ends of the members, instead of being hollow, are provided with drilled or bored side extensions, adapted to receive the tie rods.

In any case, such auxiliary members can be of variable lengths to provide cages having a varied cross width depending upon the number of members used in the bottom wall and head walls; whereas the longitudinal side walls can be constructed of blind sheets provided with only drillings or slots for aeration, so as to reduce the distance between contiguous cages without endangering the caged birds.

The structure also includes an upper access port, preferably inclined and hinged along a side, an externally positioned watering channel and means for receiving the eggs.

Experiences, acquired during the practical execution of the invention, have proven that particularly in existing aviculture installations, comprising multiple batteries of cages it is convenient to use metal support framework, in which the individual plastic cages can be easily inserted. Also where no pre-existing metal framework of multiple plane batteries are available, it is likewise advantageous to provide stands or frame adapted to support a plurality of plastic cages suitably arranged and disposed.

Figure 1:
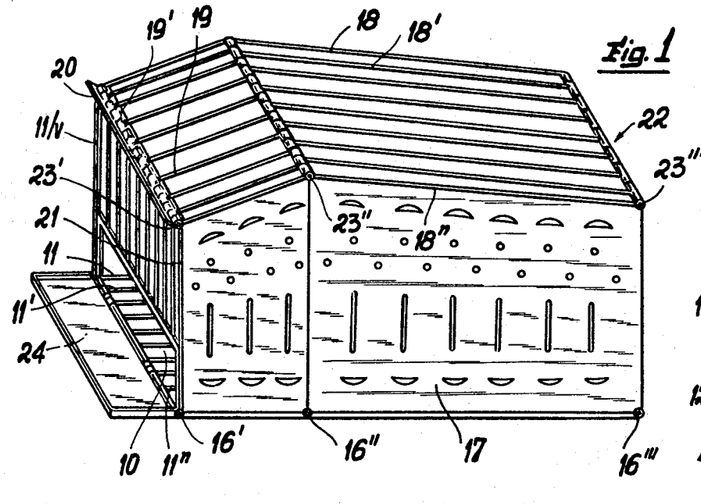
FIG. 1 is a perspective view of a cage structure according to the invention.

Referring now to drawings, FIG. 1 illustrates a cage structure for aviculture installations according to this invention, consisting of molded plastic members hinged on auxiliary members comprising transverse tie rods to thereby form a floor 10 for supporting the birds and consisting of horizontally disposed members 11, 11' . . . 11$^n$. Members 11, 11' etc., are provided with terminal heads 12, 12' . . . 12$^n$ and 13, 13' . . . 13$^n$ having a hollow T-shape, strung on transverse tie rods 16', 16'', 16'''. The roof comprises a fixed section consisting of mountable members 18, 18' . . . 18$^n$, similar and parallel to members 11, 11' . . . 11$^n$ of the floor; and an inclined hinged door consisting respectively of terminal heads 14, 14' . . . 14$^n$ and 15, 15 . . . 15$^n$ of hollow T-shape, slipped over transverse tie rods 23', 23'', 23'''. The two vertical head walls 22, 21 consist of mountable pressed or molded members similar to the preceding ones, disposed vertically so as to be positioned with their hollow heads, in an alternate manner with the horizontal members, over transverse tie rods 16', 16''' and 23', 23''', respectively. The side flanks consist of blind walls 17, 17' with only slots and aeration holes and are fastened to the extended ends of the transverse tie rods 16', 16'', 16''' and 23', 23'', 23''' by means of locknuts, bayonet caps or any other suitable means. At the lower end 19' of the door 19, or at the position of the head wall 22 is arranged a water channel 20, 20' while an outer extension 24 of the floor 10 serves to receive the eggs as these are produced.

Figure 2:
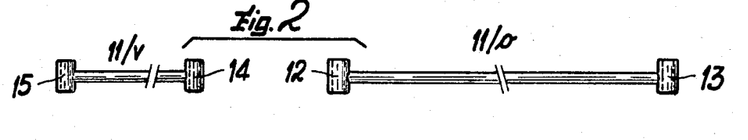
FIG. 2 is an exploded plan view of a portion of the cage shown in FIG. 1.

FIG. 2 shows in more detail the mountable pressed or molded members 11 having perforated ends 12–13 and 14–15.

Figure 3:
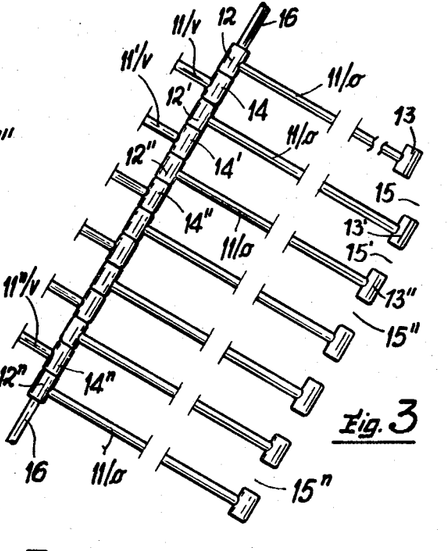
FIG. 3 is an enlarged detailed fragmentary elevational view of a portion of the floor of the cage shown in FIG. 1.

FIG. 3 shows in plan the structure of the floor 10 with the horizontal members 11, 11' ... 11$^n$ having perforated ends 12, 12' ... 12$^n$ slipped over the auxiliary members or transverse tie rods 16 alternated with the perforated heads 14, 14' ... 14$^n$ of the members 11, 11' ... 11$^n$. The perforated terminal heads 13, 13' ... 13$^n$ of the horizontal members 12 are alternated with the terminal heads of the vertical members of the wall 22 on the transverse tie rods 16'''.

Figure 4:
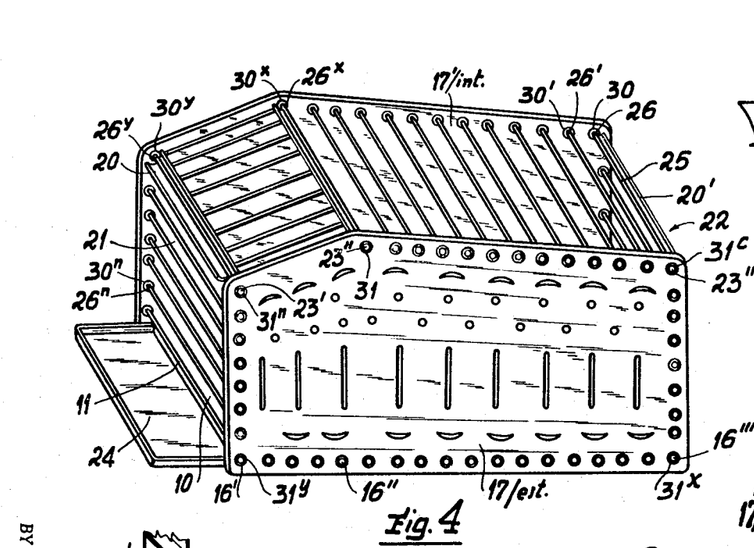
FIG. 4 is a perspective view of a second cage structure according to the invention.

FIG. 4 illustrates a cage for aviculture installations similar to that shown in FIG. 1, but in which the mountable pressed members 25 are all of equal length and fitted with solid terminal heads 26, 26' ... 26$^n$ and 27, 27' ... 27$^n$. Instead of being hollow these members are built as a core, carrying at axial ends knots 28, 28' ... 28$^n$ and 29, 29' ... 29$^n$m suitably shaped to elastically enter, by simple manual pressure, recesses 30, 30' ... 30$^n$ and 31, 31' ... 31$^n$ arranged (during the pressing or forming operation) in the internal faces of the blind walls 17–17', and preferably on a perimetrical band of both faces. The transverse tie rods, in FIG. 1, are thus eliminated and the members 25 are mounted horizontally by connecting the side flanks 17–17' by means of the axial knots 28, 28' ... 28$^n$ and the recesses 30, 30' ... 30$^n$ and axial knots 29, 29' ... 29$^n$ and corresponding recesses 31, 31' ... 31$^n$ of the flanks or side walls.

Figure 5:
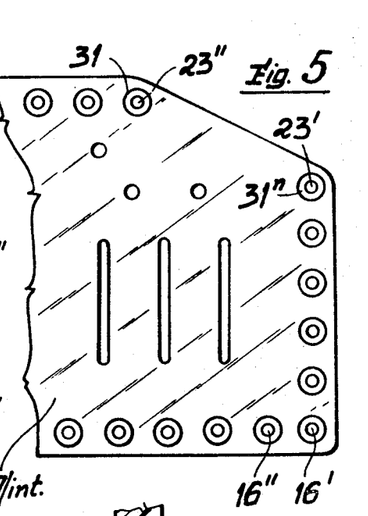
FIG. 5 is a fragmentary elevational view of a side portion of the cage shown in FIG. 4.

FIG. 5 shows in detail a fragment of blind side wall 17, provided with insertion recesses 30, 30' ... 30$^n$.

Figure 6:
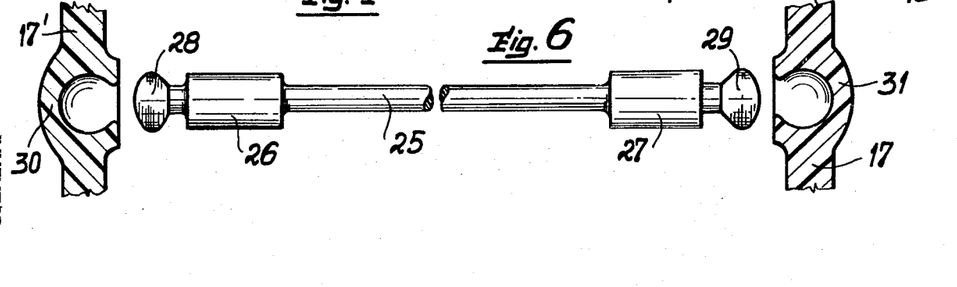
FIG. 6 is an enlarged detailed fragmentary sectional view of the snap-apart structure of the cage shown in FIG. 4.

FIG. 6 shows in detail an end section of a mountable member 25 provided with axial knots 28 and 29 adapted to be received in opposed recess sections 30 or 31 by mutual elastic coupling soa s to form a rigid joint.

FIGS. 7 through 13 illustrate a structure of a cage similar to that shown in FIG. 4, but in which the walls thereof are molded of a flexible plastic in the form of an open mesh and the pressed or molded elements connecting the walls are interconnected by structure which forms an open mesh defining the top, back, bottom and front surfaces of the cage.

Figure 7:
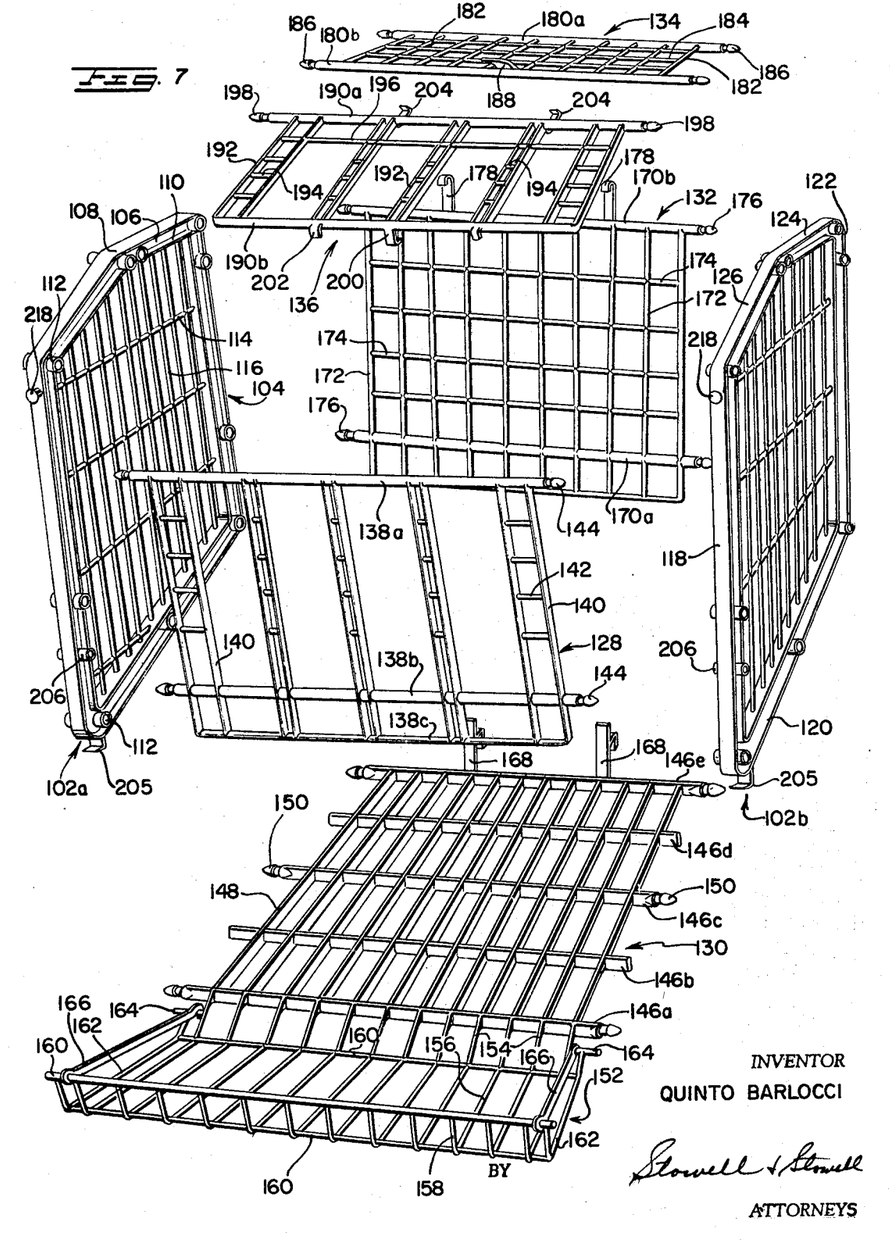
FIG. 7 is an exploded view of another cage embodying the features of this invention showing the component parts thereof in a disassembled condition.

Referring now more particularly to FIG. 7, identical wall members shown generally at 102a and 102b, comprise an integrally molded plastic structure including an annular edge portion generally indicated at 104 and preferably configured in cross section, with particular referenceto side 102a, as an I beam having a center web 106 and top and bottom transverse flanges 108 and 110. A plurality of sockets 112 formed transversely on each face of the web 106, are disposed at spaced points around the edge portion 104. A series of intersecting horizontal and vertical bars 114 and 116, formed to span the space within the edge portion 104, defined an open mesh screen to complete the wall 102a. Since, as was stated before, the walls are idential, the above described components should also be understood to apply to the wall 102b. Although the form of the edge portion 104 may be of any suitable shape, a preferred configuration has been illustrated. With particular reference to side wall 102b, it is seen that the edge portion comprises a vertical front portion 118, a rearwardly and upwardly sloping bottom portion 120, a vertical rear portion 122, a horizontal top-rear portion 124 and a forwardly and downwardly sloping top-front portion 126.

The remaining structure of the cage comprises cross-connecting members including a front wall shown generally at 128, a floor or bottom wall 130, a back wall 132, a top wall 134 and a door 136.

The front wall 128 includes transverse horizontal elements 138a, 138b and 138c intersected by a series of vertical bars 140. As shown, the bars 140 are preferably arranged in pairs, interconnected by horizontal bars 142 with a greater spacing between pairs of bars than between the bars of each pair for purposes to be described below. The elements 138a and 138b are disposed in spaced relation so as to correspond to the spacing of the sockets 112 on the bottom portion 120 of the side walls 102a and 102b and are provided with projecting heads 150 on each end thereof. An egg tray, indicated generally at 152, is integrally formed along the forward edge of the bottom wall 130 and comprises forwardly and downwardly extending longitudinal members 154, horizontal members 156 and vertical members 158, all corresponding to extensions of the longitudinal bars 148. A series of transverse bars 160 intersect the above described members to complete the basic tray structure.

Outriggers, comprising a longitudinal member 162 connected to each end of the bars 160 and terminating in transversely disposed pins 164 formed on the outermost members 154, are disposed on each end of the tray 152. A pair of braces 166, having appropriate fitting on each end thereof, are connected by snap fit to the forwardmost bar 160 and the pins 164 to provide a required stability for the tray 152 and to segregate, if desired, eggs produced by the bird occupying the cage to which the tray corresponds. It should be noted that, with the above described construction, the floor 130 may be formed as one integral die molded piece, the braces being added after formation of the floor.

The rearmost edge of the floor 130 has, connected to the element 146e, a pair of upstanding clip or hooks 168 for purposes to be described herein below.

The back wall 132 is comprised of a pair of transverse, horizontal elements 170a and 170b, which are interconnected by a series of vertical bars 172. A plurality of horizontal bars 174 intersect the vertical bars 172 to form therewith an open mesh screen. The elements 170 are disposed in corresponding spaced relationship to the sockets 112 on the back portion 122 of the side walls 102a and 102b and are provided with projecting heads 176 on each end thereof. The upper edge of the back wall 132 is provided with a pair of clips or hooks 178 mounted to the element 170b for purposes to be described hereinafter.

The top 134 comprises a pair of transverse elements 180a and 180b interconnected by a plurality of longitudinal bars 182. A series of transverse bars 184 intersect the bars 182 to form therewith an open mesh screen. The elements 180a and 180b are spaced to correspond with the spacing of the sockets 112 in the top rear portion 124 of the side walls 102a and 102b and are provided with projecting heads 186 at each end thereof. A tongue 188 extends upwardly and outward from the midportion of the element 180b as shown.

The door 136 includes a pair of transverse elements 190a and 190b interconnected by bars 192 spaced in a manner corresponding to the bars 140 of the front wall 128. Transverse bars 194 are disposed between pairs of bars 192 as shown and an elongated transverse bar 196 intersects the bars 192 proximate the element 190a. The element 190a is provided on each end with projecting heads 198. A clip or hood 200 depends from the element 190b and is flanked by a pair of depending tongues 202. Rearwardly extending hooks 204 depend from the transverse member 190a.

A transversely extending socket 206, similar to but smaller than the sockets 112, is provided proximate the lower end of the front portion 118 of the side walls 102a and 102b for purposes to be described hereinbelow. Downwardly extending hooks 205 depend from the lower surface of the lower portions 120, also for purposes to be described below.

As with the bottom wall 130, it can be readily seen that each of the aforedescribed components is configured to be readily moldable as single, integral units, thereby providing an inexpensive, simply assembled cage structure.

Figure 8:
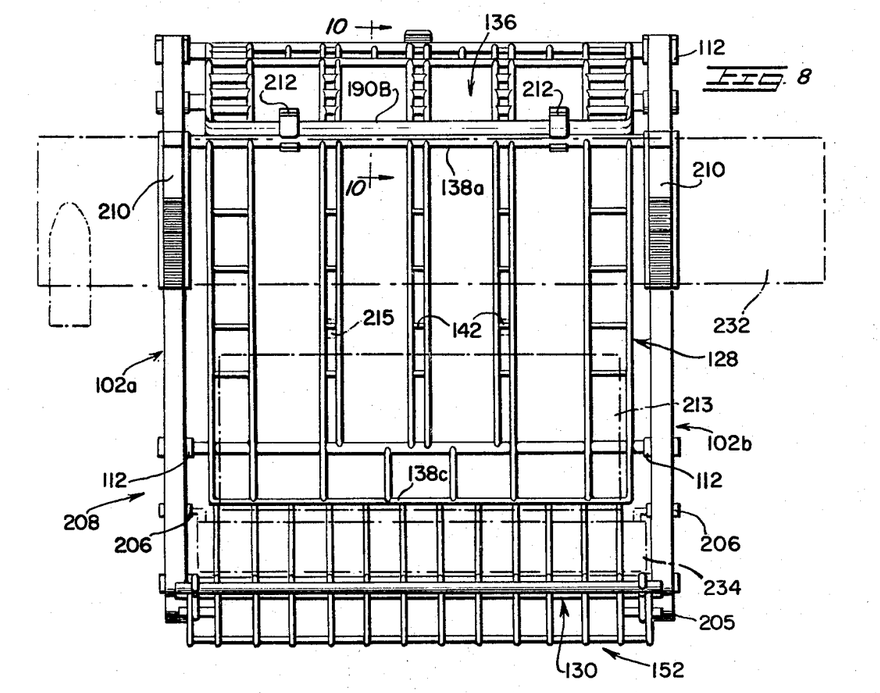
FIG. 8 is a front view of the assembled cage of FIG. 7.
Figures 9, 11:
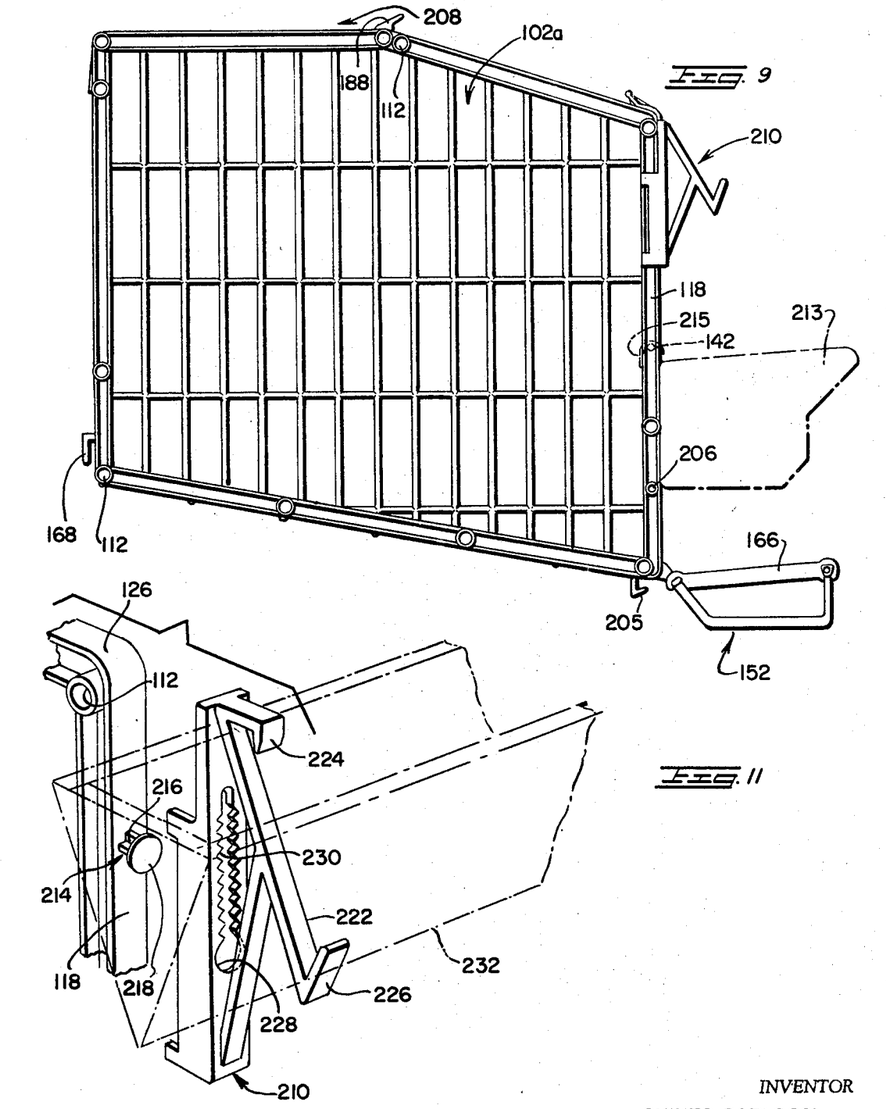
FIG. 9 is a side view of the cage of FIG. 8.
FIG. 11 is a fragmentary perspective view showing a structural detail of the cage of FIG. 8.

Referring now to FIGURES 8 and 9, the cage, generally indicated at 208, is illustrated in a fully assembled condition. In the assembled condition, brackets 210 are affixed proximate the upper end of the side wall front portions 118 by means to be described in more detail hereinafter. Clips 212 are emplaced around elements 138a and 190b to prevent movement therebetween. As can be seen in FIGURE 8, the lower element 138c of the front wall 128 is spaced above the floor 130 to provide a gap therebetween. The floor 130 is disposed at a downwardly and forwardly sloping angle toward the tray 152 and a feed trough or channel is connected, as shown in phantom at 213, to the front wall 128 by means of hooks 215, disposed over the bars 142.

Figure 10:
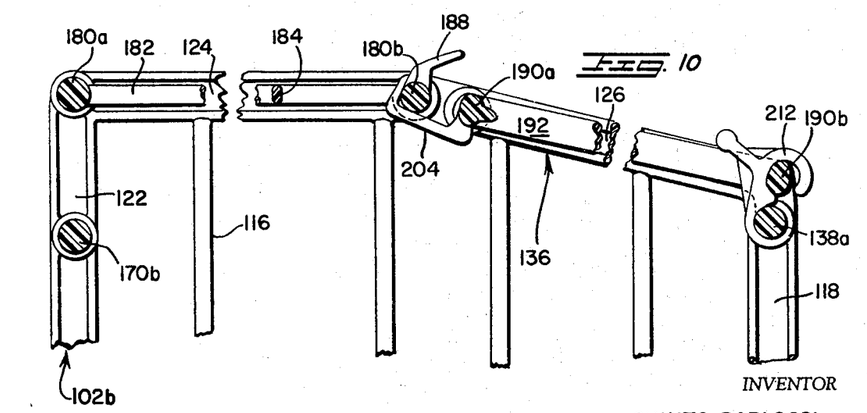
FIG. 10 is a fragmentary sectional view taken along the line 10—10 of FIG. 8.

In FIGURE 10, an enlarged sectional view of a portion of the cage structure, illustrates the door 136 and the clamp 212 in greater detail.

FIGURE 11 is an enlarged perspective view of the upper end of the front portion 118 one of the side walls showing the detail of the connecting means for the bracket 210. A button 214 having shank 216, cruciform in cross section, and an enlarged head 218, is formed on the front face of the front portion 118. The bracket 210 comprises a base member 220, L-shaped in cross section and a mounting support arm 222 with upper and lower hooks 224 and 226 at either end thereof. The transverse face of the base 220 has therein a circular opening 228, of sufficient diameter to accept the enlarged head 218 of the button 214. A serrated slot 230, of suitable width to selectively fix the shank 216 of the button 214 along the length thereof, extends upwardly from the opening 228. The bracket 210 is mounted by disposing the button head 218 through the opening 230 and moving the bracket 210 downwardly to a suitable height to support a water supply trough, or channel shown in phantom at 232, at a desired height. The serrations of the slot 230 coact flexibly with the transverse arm of the button shank 216 to provide selective height control for the bracket 210.

Figures 12, 15:
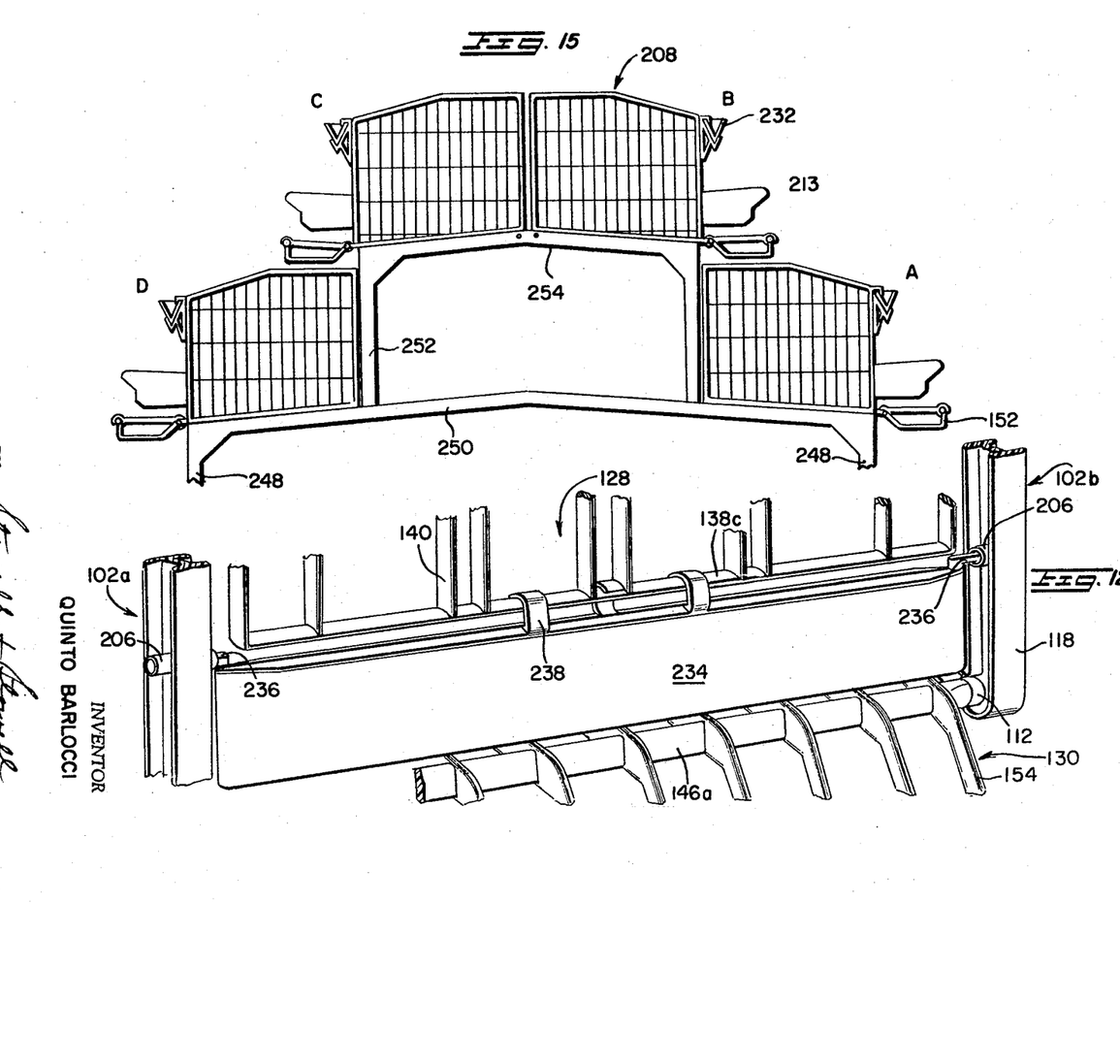
FIG. 12 is a fragmentary perspective view showing another structural detail of the cage of FIG. 8.
FIG. 15 is a side view of the assembly of FIG. 14.

Referring now to FIGURE 12, another detail of the assembled cage structure is shown in perspective. The aforedescribed gap between the floor 130 and the lower portion of the front wall 128 is preferably covered by a swinging gate 234 which depends from pins 236 extending transversely from the upper edge of each end of the gate into the sockets 206. Upwardly extending hooks 238, disposed near the midportion of the gate 234, engage the element 138c to provide pivotal support for the gate at that point.

Figure 13:
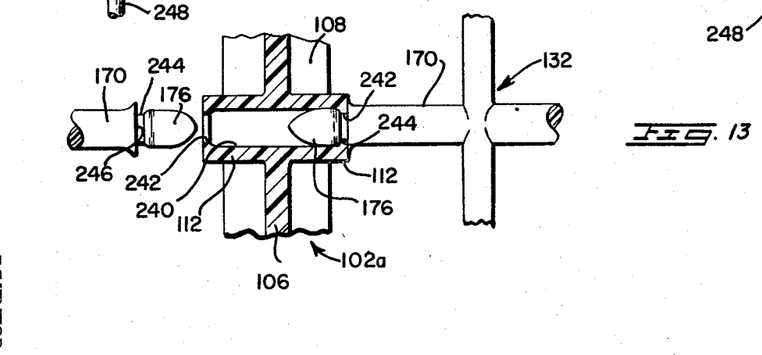
FIG. 13 is a fragmentary sectional view showing a further structural detail of the cage of FIG. 8.

In FIGURE 13, a sectional view of the snap connection feature in accordance with this invention is shown in enlarged detail. Although the details of this particular structure apply to the projecting heads of each of the aforedescribed components (for simplicity) this structure is described as applied to the snap connection between element 170a of the read wall 132 and the side wall 102a. The sockets 112 are formed with a bore 240 extending therethrough. The bore 240 is provided with reduced mouth portions 242 formed around either end thereof. The heads 176 have a reduced neck portion 244 therebehind, which reduced portion corresponds approximately to the inner diameter of the mouth 242. The element 170a terminates in a transverse shoulder 246 which provides a stop to limit penetration of the head 176 in the bore 240. The snap fit is accomplished by pressing the head 176 into the bore 240 with sufficient force to elastically deform the mouth 242. With penetration, the mouth 242 "snaps" into the neck portion 244 to releasably connect the element 170a and the side wall 102a.

In assembly, the pair of side walls 102a and 102b are disposed in parallel coextensive spaced relationship and one of the cross components, the bottom member 130 for example, is disposed therebetween. The projecting heads 150 thereof are then snap fitted into the sockets 112 of the bottom portions 120 of each of the side walls to provide interconnection therebetween. Next another cross member, the back wall 132 for example, is disposed between the side walls 102a and 102b and the projecting heads 176 thereof are similarly snap fitted into the sockets 112 of the back portions 122 of each of the side walls to continue the construction of the enclosure.

In a like manner the protruding heads 186 and 144 of the top and the front walls 134 and 128 are inserted and snap fitted into the corresponding sockets 112 of the top rear and front portions 124 and 118 respectively, while the heads 198 of the door 136 are inserted in the sockets 112 of the top front portions 126 to complete the enclosure. It should be obvious that, since only the element 190a of the door 136 is connected to the side walls, the door is pivotally mounted for opening and closing about the element 190a. The hood 200 and tongues 202 engage the element 138a of the front wall 128, when the door 136 is closed to serve as guides and to maintain the door latched in the closed position, as seen in FIGURES 8 and 9. The clips 212, when disposed around the elements 138a and 190b as in FIGURE 8, serve to lock the door 136 in the closed position.

The brackets 210 are then attached on the front portions 118 as was described above and the gate 234 (FIGURE 12) is installed.

It should bereadily seen that, with the above described structure, the door 136 provides access to the interior of the cage for installation or removal of birds therein while the gate 234 allows egress of eggs produced by the bird in the cage yet prevents pecking damage to the eggs in the tray 152. The open spaces between the pairs of bars 140 and 192 in the front wall 128 and the door 136 respectively provide access for the birds to the water supply and feed troughs 232 and 213. It should be obvious that the above described cages can be utilized for growing or breeding, if so desired, in which case elements, such as the tray 152, may be omitted if so desired.

Figure 14:
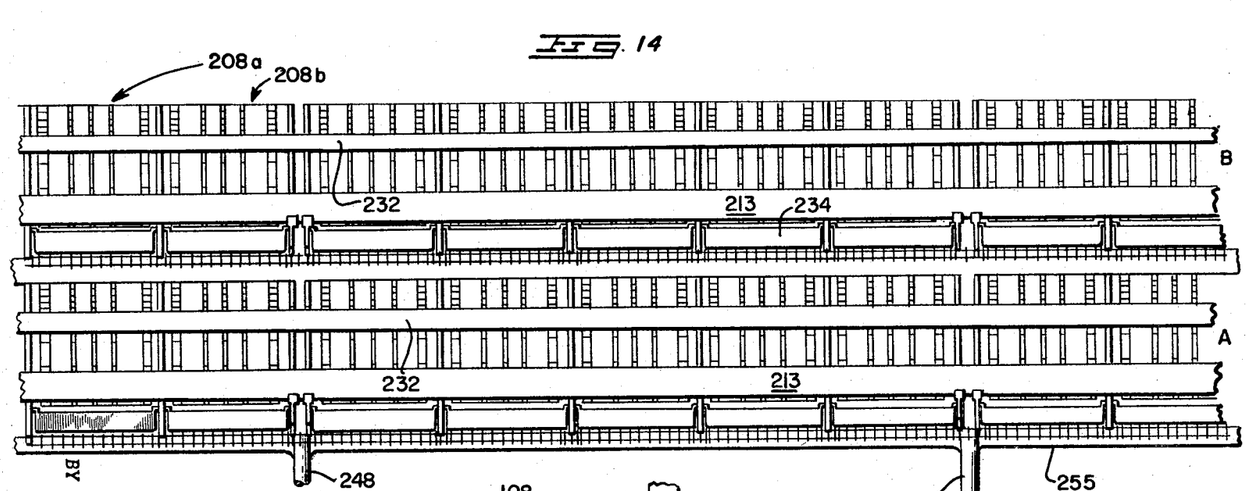
FIG. 14 is a fragmentary elevational view of a plurality of cages in accordance with the invention assembled in tiered, banked fashion.

Referring now to FIGURES 14 and 15, the cage unit of FIGURES 7 through 13 is shown erected in battery or banked fashion to form a multiple unit cage structure. The cages 208 are mounted on a frame work comprising legs 248 supporting cross members 250 which slope upwardly toward the center (FIGURE 15) and a pedestal frame including pedestal legs 252 and pedestal cross members 254 which slope in a fashion similar to the cross members 250. Longitudianl members 255 (FIGURE 14) are disposed lengthwise between the legs 248 while corresponding members (not shown) similarly span the legs 252. The slope of the cross members is preferably such that the back walls of cages mounted thereon are vertically disposed. With the above described frame configuration, the cages are then constructed in tiers A, B, C and D, by sequential assembly of the cages in "common wall" fashion. For example, referring to FIGURE 14 and tier B, cage 208a is assembled as described above, and mounted on the framework. Cage 208b will then be assembled by inserting the appropriate heads of the front and back walls and the top and bottom members in the outwardly facing sockets of the right hand wall of the cage 208a. The cage 208b is then completed by adding a right hand side wall and the above procedure is repeated with the succeeding cages. As can be seen, the cages are erected in banks of five units, however, it should be understood that continuous banks of any number may be furnished if so desired. The tier arrangement may also be varied from that shown without exceeding the scope of this invention. As can best be seen in FIGURE 14, the feed troughs 213 and the water supply troughs 232 may be furnished continuous units spanning each tier of cages so that feed and water may be supplied to the cages from a single, centralized source.

The hooks 205 (FIGURE 9) maintain the cages in place on sloping cross members 250 by engaging the inner surface of the longitudinal members 248.

From the aforegoing description it can be readily seen that this invention provides a simple, lightweight cage structure which can be readily assembled or dismantled for transportation, cleaning or rearranging, which requires a minimum number of components and which can be inexpensively manufactured in large quantities.

Having now described the mountable structure which have also been represented by way of non-limiting ex- emplification, it should be admitted that such structures could be executed according to different solutions and modified embodiments in addition to those herein considered, without departing from the scope and spirit of the invention, since any equivalent solution of the problem and any structure for the use stated having the similar purposes and obtaining closely analogous results and advantages so as to appear as a derivation from whatever characteristic or characteristics specified in the appended claims would be considered as falling into the scope of the industrial protection applied for.

I claim:

1. A snap apart cage structure comprising a plurality of flexible plastic wall forming members disposed in confronting, spaced apart, coextensive relationship, said members having opposing sides provided with peripheral edge portions, each edge portion of each member including at least front, top, back and bottom segments, socket means provided on each side and disposed on each of the segments of the edge portions, said socket means projecting perpendicularly from the sides in opposite directions, said socket means having outer open ends arranged in alignment with corresponding socket means on adjacent members, a plurality of elements bridging adjacent members, said elements having projecting heads at each end thereof, said heads being inserted with snap action into corresponding socket means for snug receival thereof in said socket means to removably fasten said elements between the members, the elements extending between the respective segments of adjoining members having wall forming reticulated panel formations provided thereon inwardly of the heads and constituting front, top, back and bottom walls for the cage, whereby a unitary cage is formed with the wall forming members being adapted to join such cage to additional elements in the formation of a plurality of cages.

2. A structure in accordance with claim 1 wherein the panel formation comprising said top wall extends for a portion of the length of said top segments and wherein a single element is mounted intermediate the ends of said top segments adjacent said top wall, bars intersecting said single element and extending for the remaining portion of said top segment to provide a pivotal door for said cage.

3. A snap-apart cage for chickens or the like comprising, in combination, a pair of plates of plastic material arranged spaced from and parallel to each other and forming the side walls of said cage, said plates having edge portions and being formed along said edge portions with closely spaced sockets open toward the surface of each plate facing the other of said pair of plates, each of the sockets in one plate being aligned with a corresponding socket in the other plate; and a plurality of rod-shaped elements formed from plastic material and each having at its respective opposite ends a solid transversely extending button-shaped projection having a free end and a diameter larger than that of the element, the respective projections being shaped complementary to the corresponding sockets and being respectively inserted with snap action in aligned sockets of said plates so that said rod-shaped elements are snugly received in said sockets and removably fastened to said plates extending closely spaced from and substantially parallel to each other and substantially normal to said plates between edge portions of the latter to form together with said plates a closed cage.

4. A cage as set forth in claim 3, wherein each of said rod-shaped elements is formed adjacent each of the opposite ends thereof with an enlarged portion forming a shoulder face spaced inwardly of the free end of said projection by a distance equal to the given depth of said sockets, said shoulder face thus abutting against a plate surface portion about the respective socket and aiding in preventing axial and angular movement of said element relative to said plate.

References Cited

UNITED STATES PATENTS

| 1,588,282 | 6/1926 | Wachsman | 119—17 |
| 1,840,224 | 1/1932 | Carpenter | 119—19 |
| 2,714,269 | 8/1955 | Charles | 41—10 |
| 2,799,118 | 7/1957 | Lullo | 46—26 |

FOREIGN PATENTS 657,182    9/1951   Great Britain.

HUGH R. CHAMBLEE, *Primary Examiner.*